US008954524B1

(12) United States Patent
Hamon

(10) Patent No.: US 8,954,524 B1
(45) Date of Patent: Feb. 10, 2015

(54) ACCESS TO NETWORK CONTENT

(75) Inventor: Dominic Hamon, San Francisco, CA (US)

(73) Assignee: Google Inc., Mountain View, CA (US)

(*) Notice: Subject to any disclaimer, the term of this patent is extended or adjusted under 35 U.S.C. 154(b) by 134 days.

(21) Appl. No.: 13/419,906

(22) Filed: Mar. 14, 2012

(51) Int. Cl.
| G06F 15/16 | (2006.01) |
| G06F 15/167 | (2006.01) |
| G06F 15/177 | (2006.01) |
| G06F 17/30 | (2006.01) |
| G06Q 30/00 | (2012.01) |
| G06F 17/20 | (2006.01) |
| G06F 17/00 | (2006.01) |

(52) U.S. Cl.
USPC ........... 709/213; 709/203; 709/206; 709/217; 709/223; 709/228; 705/14.53; 705/14.54; 707/737; 707/765; 715/205; 715/234; 715/760; 715/762

(58) Field of Classification Search
None
See application file for complete search history.

(56) References Cited

U.S. PATENT DOCUMENTS

| 5,715,445 | A | 2/1998 | Wolfe |
| 5,946,682 | A | 8/1999 | Wolfe |
| 6,151,603 | A | 11/2000 | Wolfe |
| 6,301,576 | B1 | 10/2001 | Wolfe |
| 6,604,103 | B1 | 8/2003 | Wolfe |
| 6,691,106 | B1* | 2/2004 | Sathyanarayan ..................... 1/1 |
| 6,782,431 | B1* | 8/2004 | Mukherjee et al. ........... 709/246 |
| 6,993,586 | B2* | 1/2006 | Chen et al. .................... 709/228 |
| 7,003,966 | B2 | 2/2006 | Sharma et al. |
| 7,103,594 | B1 | 9/2006 | Wolfe |
| 7,467,137 | B1 | 12/2008 | Wolfe |
| 7,801,945 | B1* | 9/2010 | Geddes et al. ................ 709/203 |
| 7,908,336 | B2 | 3/2011 | Carlson et al. |
| 8,086,690 | B1* | 12/2011 | Heymans et al. ............. 709/217 |
| 8,509,816 | B2* | 8/2013 | Branch et al. .............. 455/456.3 |
| 2003/0212760 | A1* | 11/2003 | Chen et al. ..................... 709/218 |
| 2004/0130741 | A1* | 7/2004 | Ferlitsch ....................... 358/1.13 |
| 2006/0047804 | A1 | 3/2006 | Fredricksen et al. |
| 2008/0005695 | A1* | 1/2008 | Ozzie et al. ................... 715/811 |
| 2008/0189628 | A1* | 8/2008 | Liesche et al. ................ 715/762 |
| 2009/0204474 | A1* | 8/2009 | Gogri et al. ..................... 705/10 |
| 2010/0191856 | A1* | 7/2010 | Gupta et al. .................. 709/228 |
| 2010/0268717 | A1* | 10/2010 | Pilskalns ....................... 707/754 |
| 2010/0271263 | A1* | 10/2010 | Moshfeghi .................... 342/378 |
| 2010/0287178 | A1* | 11/2010 | Lambert et al. ............... 707/765 |
| 2011/0055012 | A1* | 3/2011 | Christianson et al. ...... 705/14.53 |
| 2011/0178873 | A1* | 7/2011 | Lagudi ....................... 705/14.54 |
| 2011/0191253 | A1* | 8/2011 | Pilskalns ........................ 705/71 |
| 2011/0317185 | A1* | 12/2011 | Furuya ........................... 358/1.9 |
| 2011/0320450 | A1* | 12/2011 | Liu et al. ....................... 707/737 |
| 2012/0011095 | A1* | 1/2012 | Ahrens et al. .................. 706/47 |
| 2012/0084835 | A1* | 4/2012 | Thomas et al. ................... 726/3 |

(Continued)

*Primary Examiner* — Moustafa M Meky
*Assistant Examiner* — Ho Shiu
(74) *Attorney, Agent, or Firm* — Lerner, David, Littenberg, Krumholz & Mentlik, LLP

(57) ABSTRACT

A method and system for improving access to network content are described. Aspects of the disclosure minimize the delay between a navigation event and a network response by prerendering the next navigation event. For example, the method and system may predict a likely next uniform resource locator during web browsing to preemptively request content from the network before the user selects the corresponding link on a web page. The prediction operation may use a current location of a computing device to identify a set of browsing habits associated with that location. The browsing habits may be used to identify a most likely navigation event for prerendering. The methods and systems describe a variety of manners for prerendering content and managing and configuring prerendering operations.

18 Claims, 10 Drawing Sheets

(56) References Cited

U.S. PATENT DOCUMENTS

| | | | |
|---|---|---|---|
| 2012/0137201 A1* | 5/2012 | White et al. | 715/205 |
| 2012/0221697 A1* | 8/2012 | Sainio et al. | 709/223 |
| 2012/0246257 A1* | 9/2012 | Brown | 709/213 |
| 2012/0311465 A1* | 12/2012 | Nealer et al. | 715/760 |
| 2012/0317217 A1* | 12/2012 | Lavy et al. | 709/206 |
| 2012/0324043 A1* | 12/2012 | Burkard et al. | 709/217 |
| 2013/0007260 A1* | 1/2013 | Jain et al. | 709/224 |
| 2013/0019159 A1* | 1/2013 | Civelli et al. | 715/234 |
| 2013/0117110 A1* | 5/2013 | Wu et al. | 705/14.54 |
| 2013/0122934 A1* | 5/2013 | Branch et al. | 455/456.3 |
| 2013/0150086 A1* | 6/2013 | Caralis et al. | 455/456.3 |
| 2013/0246184 A1* | 9/2013 | Flood et al. | 705/14.66 |
| 2014/0095966 A1* | 4/2014 | Burkard et al. | 715/205 |

* cited by examiner

ACCESS TO NETWORK CONTENT

BACKGROUND

The advent of the World Wide Web has placed more information at the fingertips of today's users than ever before. Various websites cater to nearly every need and interest, providing access to reference information, business and financial documents, social networking, and more. Widespread broadband Internet access provides faster access to these sites than ever before.

However, as fast as current high-speed Internet services are, the act of browsing the web is not instantaneous. When a user selects a link on a page or enters a uniform resource locator (URL) in a text field, there is a delay while data is requested from the host, sent to the client, and rendered in the browser. The user is typically idle while waiting for their requested site to load. While high-speed Internet access may limit this delay to a few seconds, even this short delay can add up to thousands of man-hours of lost productivity each year.

BRIEF SUMMARY

A method and system for improving access to network content are described. Aspects of this disclosure minimize the delay in accessing web content by identifying (e.g., predicting) a user navigation event on a web page. Aspects of the disclosure then request content associated with the next navigation event and prerender the content in a hidden application instance. When the user actually selects the navigation event, the hidden application instance is displayed to the user, minimizing the delay the user experiences. The prediction of the navigation event may be made based on navigation history data, such as the websites that the user previously visited. This navigation history may include location data, and user navigation events may be clustered to identify particular locations where the user performs browsing operations. When predicting a navigation event, the location of the user may be evaluated to determine if it is likely that a particular cluster of navigation events is likely to provide accurate prediction data. The location of the user may thus be utilized to predict the navigation event for prerendering.

Aspects of the disclosure describe a computer-implemented method for accessing network content. The method may include determining a location of a client device, identifying, using a processor, a set of browsing habits corresponding to the location of the client device, the set of browsing habits comprising a subset derived from a plurality of navigation events, the subset may be associated with the location, predicting a navigation event using the set of browsing habits corresponding to the location of the client device, and prerendering the predicted navigation event using the client device. The plurality of navigation events may be divided into subsets using a clustering function, and the plurality of navigation events may be clustered based on a location at which the navigation event was accessed. The plurality of navigation events may be associated with a particular user account. The location may be determined using a location application programming interface. The plurality of navigation events may be stored as navigation event-location pairs. The method may further include sending the location to a remote server, and receiving the set of browsing habits from the remote server in response to sending the location to the remote server. The method may further include selecting a selected navigation event, and storing the location and the selected navigation event in the plurality of navigation events.

Aspects of the disclosure provide a non-transitory computer readable storage medium storing instructions, that when executed by a processor, cause the processor to perform a method. The instructions may include determining a location of a client device, identifying a set of browsing habits corresponding to the location of the client device, the set of browsing habits comprising a subset derived from a plurality of navigation events, the subset associated with the location, predicting a navigation event using the set of browsing habits corresponding to the location of the client device, and prerendering the predicted navigation event using the client device. The plurality of navigation events may be divided into subsets using a clustering function, and the plurality of navigation events may be clustered based on a location at which the navigation event was accessed. The plurality of navigation events may be associated with a particular user account, and wherein the client device may be logged into the particular user account. The location may be determined using a location application programming interface. The plurality of navigation events may be stored as navigation event-location pairs. The instructions may further include sending the location to a remote server, and receiving the set of browsing habits from the remote server in response to sending the location to the remote server. The instructions may further include selecting a selected navigation event, and storing the location and the selected navigation event in the plurality of navigation events.

Aspects of the disclosure further provide a processing system for predicting navigation events. The processing system may include a memory for storing a plurality of navigation events, each of the plurality of navigation events being associated with at least one location, and at least one processor coupled to the memory. The at least one processor may be configured to cluster the plurality of navigation events into one or more subsets using at least one location associated with each of the plurality of navigation events, the one or more subsets corresponding to at least one set of user browsing habits, and predict a next navigation event using at least one of the one or more subsets. The processor may be further configured to receive a current location from a client device, and determine the at least one of the one or more subsets to be used in predicting the next navigation event using the current location. The next navigation event may be predicted by sending the at least one of the one or more subsets to a client device. The next navigation event may be predicted by selecting the next navigation event from the at least one of the one or more subsets and sending the next navigation event to a client device. The processor may be further configured to accept a user credential to access a user account, and wherein the plurality of navigation events are associated with the user account. The processor may be further configured to receive at least one of the plurality of navigation events and a location associated with the at least one navigation event, and store the at least one of the plurality of navigation events and the location associated with the at least one navigation event in the memory.

DETAILED DESCRIPTION

Embodiments of a system and method for improving access to network content are described herein. Aspects of the disclosure minimize the delay between a user's selection of a navigation event and display of the content associated with the navigation event by prerendering content associated with the navigation event prior to the user's selection of the event. For example, the method and system may predict a likely next uniform resource locator during web browsing to preemptively request content from the network before the user selects the corresponding link, thus minimizing the wait time when a user selects a hyperlink on a web page. Various methods for performing the prerendering operation, configuring the prerendering operation, and managing the prerendering operation are described. For the purposes of this application, the term "prerendering" generally refers to the act of requesting all resources (e.g., any executable code, scripting language, files, and/or interactive objects) necessary to load the content of a web address, and loading the content in a web browser instance.

In order to optimize the prerendering process, data, metrics, and indicators may be used to select a particular navigation event for prerendering. For example, aspects of the disclosure may attempt to determine the most likely navigation event based on historical data associated with user browsing habits. One set of metrics that may be useful for predicting a likely navigation event may utilize the location of the user, as a user may exhibit different browsing habits based on his/her location.

The system can provide privacy protections for the client data including, for example, anonymization of personally identifiable information, aggregation of data, filtering of sensitive information, encryption, hashing or filtering of sensitive information to remove personal attributes, time limitations on storage of information, and/or limitations on data use or sharing. Data can be anonymized and aggregated such that individual client data is not revealed. A user may also be provided with an opportunity to opt in/out to enable the collection of sharing of data.

Figure 1:
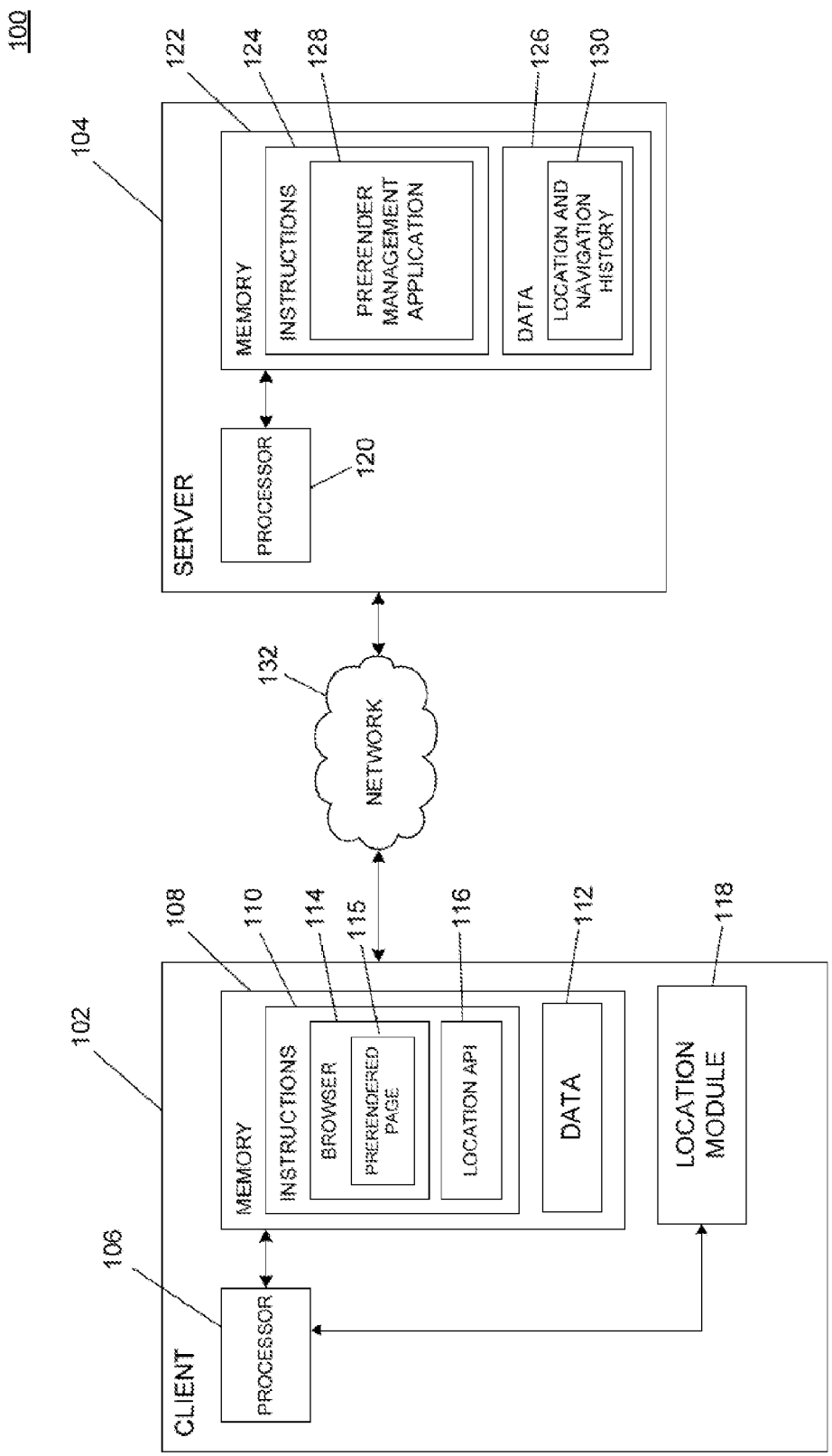
FIG. 1 is block diagram depicting an example of a client device in communication with a server in accordance with aspects of the disclosure.

FIG. 1 is a detailed view of system 100 including a client 102 and a server 104 in communication with a network 132. The system 100 is operable to use location information to predict a navigation event in accordance with aspects of the disclosure. The client 102 may be operable to request web content from the server 104, and display the web content, such as via a browser 114. The client 102 may be computing device such as a laptop computer, a desktop computer, a netbook, a rack-mounted server, a smartphone, a cellular phone, a tablet computer, or any other device containing programmable hardware or software for executing instructions. The client 102 may include a processor 106, a memory 108, a location module 118, and other components typically present in general purpose computers. The processor 106 may be any processor capable of execution of computer code. Alternatively, the processor 106 may be a dedicated controller such as an application-specific integrated circuit ("ASIC") or other processing device.

The client 102 may have all of the components normally used in connection with a wireless mobile device such as a central processing unit ("CPU"), memory (e.g., RAM and ROM) storing data and instructions, an electronic display (e.g., a liquid crystal display ("LCD") screen or touchscreen), user input (e.g., a keyboard, touch-screen or microphone), camera, a speaker, a network interface component, and all of the components used for connecting these elements to one another. Some or all of these components may all be internally stored within the same housing, e.g., a housing defined by a plastic shell and LCD screen.

The memory 108 may store information that is accessible by the processor 106, including instructions 110 that may be executed by the processor 106, and data 112. The memory 108 may be of any type of memory operative to store information accessible by the processor 106, including a non-transitory computer-readable medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

The instructions 110 may be any set of instructions to be executed directly (such as machine code) or indirectly (such as scripts) by the processor 106. For example, the instructions 110 may be stored as computer code on the computer-readable medium. In that regard, the terms "instructions" and "programs" may be used interchangeably herein. The instructions 110 may be stored in object code format for direct processing by the processor 106, or in any other computer language including scripts or collections of independent source code modules that are interpreted on demand or compiled in advance.

The instructions 110 may comprise an application for a web browser 114 and a location application programming interface (API) 116. The web browser 114 may be operable to display network content, such as web pages, to a user of the client 102. The web browser 114 may perform prerendering functions, where content is retrieved and rendered in a hidden browser instance before the user actually selects the network content for display. In this manner, delay in the display of network content may be minimized by performing network and rendering operations in parallel with the user's other browsing activities.

The browser 114 may further comprise a prerendered web page 115. The prerendered web page 115 represents a web page that was requested and accessed by the browser in response to a predicted navigation event. The prerendered web page 115 may be stored in a hidden rendering environment such that the prerendered web page 115 is not visible to a user until the user selects a navigation link with which the prerendered web page 115 is associated. The hidden rendering environment refers to any representation that does not have an immediately apparent interface for the user. For example, the prerendered web page 115 may be stored within a browser "tab" that does not have an associated selection control in a web browser tab interface. The hidden rendering environment may be accessible via a menu or interface command, and in response to the selection of this interface command an interface for the prerendered content is generated, such as by adding a selection control for the prerendered content to the browser tab interface. The hidden rendering environment may also be provided by a variety of other methods suitable to receive and render the page environment while avoiding distraction of the user with potentially irrelevant content. The prerendered web page 115 may be stored in a completely executed and rendered format. For example, any executable code, scripting language, multimedia files, and/or interactive objects may be fully requested and loaded in the prerendering environment. In the event the user selects the navigation event associated with the prerendered web page 115, the browser 114 may swap the prerendered web page 115 into an active browser instance, thus providing the content associated with the navigation event without the need to send another network request.

Location information may be used in the process of predicting network content for prerendering. This location information may be received via the location API 116. The location API 116 may be operable to identify a location of the client device 102 to other programs executing on the client device 102, without said other programs needing to interface directly to a location module, such as the location module 118. For example, the browser 114 may query the location API 116 for the current location of the client device 102. Depending upon the tools available to determine the location, the location API 116 may provide the browser 114 with an estimated location of the client device 102 within a particular area. If the client device 102 includes a GPS receiver and the GPS receiver can determine an accurate location of the client device 102 (e.g., within 5-15 meters), the location API 116 may provide the location to the browser 114 at a high resolution. Alternately, if the client device 102 cannot determine a location at a high resolution, a location may be provided at a lower resolution by alternative means (e.g., by identifying cellular tower strength, wireless access point signal strength, triangulation, time difference of arrival, etc.). A precise location may not be provided to the browser 114 for privacy concerns. For example, if the location is requested by an untrusted website, then the location API may only provide a low resolution location such as a particular city or state. The system can provide privacy protections for the location data, such as, for example, anonymization of personally identifiable information, aggregation of data, filtering of sensitive information, encryption, hashing or filtering of sensitive information to remove personal attributes, time limitations on storage of information, and/or limitations on data use or sharing. Data can be anonymized and aggregated such that individual client data is not revealed. A user may also be provided with an opportunity to opt in/out to enable the collection of sharing of data.

When the browser 114 is used to perform navigation operations (e.g., requesting of web page content), the location API 116 may be queried to determine the location of the client device 102 when the navigation operation occurs. The content request and location information may be transmitted to the server 104 for storage and analysis, or the location data may be stored on the client device 102, and the analysis performed by the client device 102. The content request and location information may be encrypted, hashed, and/or otherwise anonymized before transmission to the server 104.

The data 112 may be retrieved, stored or modified by the processor 106 in accordance with the instructions 110. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. In a further example, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

Although FIG. 1 functionally illustrates the processor 106 and memory 108 as being within the same block, the processor 108 and memory 110 may actually comprise multiple processors and memories that may or may not be stored within the same physical housing. Accordingly, references to a processor, computer or memory will be understood to include references to a collection of processors, computers or memories that may or may not operate in parallel.

The server 104 may be operable to host web content and user navigation history data and location data, to predict a next navigation event, and/or to provide location and history data to the client 102 so that the client may predict the next navigation event. The server 104 may be configured similarly to the client 102, with a processor 120 and memory 122. As described with respect to the client 102, the memory 122 may comprise a set of instructions 124 and a set of data 126. The processor 120 executes the instructions 124 to control operation of the server 104. The instructions 124 may include a prerender management application 128 for receiving navigation and location history data from the client 102, for predicting a navigation event based on information received from the client, and for providing the client with the predicted navigation event (e.g., by embedding a prerender tag in content hosted by the server 104).

The prerender management application 128 may access location and navigation history data 130 stored in the data 126 to perform prediction operations. Location and navigation history data 130 is preferably stored in an anonymous fashion, such that user privacy is preserved. For example, location and history data may be stored in an encrypted format on the server 104. In order to safeguard user privacy, the location and history data may be stored and processed on the client device 102, without exposing personal user data outside of the client device 102. Although the present example shows the prerender management application 128 executing on the server 104, the prerender management application 128 may execute on the client 102.

Portions of the data 112 may comprise the location and navigation history data 130. The location and history data 130 may store a set of navigation events indexed by the location at which the navigation events occurred. For example, when a user accesses a particular web page, the browser 114 may determine a location of the user using a location API 116. The location provided by the location API 116 may be associated with the navigation event, and stored together. For example, the location and history data 130 may be stored as follows:

TABLE 1

| Navigation Event | Location |
| --- | --- |
| www.url1.com | 40°39'32"N/74°20'52"W |
| www.url2.com | 40°39'32"N/74°20'52"W |
| www.url3.com | 40°17'46"N/74°3'5"W |
| www.url3.com | 40°17'46"N/74°3'5"W |

Although Table 1 depicts location data as being stored in a "degrees/hours/minutes" format, the location of each navigation event could be stored in any location format. The prerender management application 128 may employ a geocoder to change data from one location format into another. The client 102 may encrypt, anonymize, or lower the resolution of location data before sending the information to the server to preserve user privacy.

The prerender management application 128 may further cluster navigation events to establish browsing histories at particular locations. Depending upon the location of the user, they may access different web pages. For example, a user may have different browsing habits at work than at home. The prerender management application 128 may identify navigation events that are clustered together, and associate events in the same cluster with one another. Each of these clusters may correspond to a particular set of browsing habits by the user. A cluster may be multiple points in a particular area, since locations may be provided with different resolutions by the location API 116, and thus navigation events may appear to be from slightly different locations due to low-resolution location reporting (e.g., by using cellular tower data or IP address lookup), but in fact are performed from the same location. When predicting a navigation event, the prerender management application 128 may receive a location from the client 102 and determine an appropriate cluster representing a set of browsing habits associated with the location. The navigation event data contained within the determined cluster may thus be used to predict a navigation event for prerendering by the client 102.

The server 104 may be at a first node of a network 132 and the client 102 may be at a second node of the network 132. The server 104 and the client 106 may be operative to directly and indirectly communicate with other nodes of the network. For example, the client 102 may comprise a mobile device that is operative to communicate with the server 104 via the network 132 such that the server 104 uses the network 132 to transmit and display web content to a user via the client 102. The server 104 may also comprise a plurality of computers that exchange information with different nodes of a network for the purpose of receiving, processing and transmitting data to the client devices. In this instance, the client 102 may be at a different node of the network than any of the computers comprising the server 104.

The network 132 and the intervening nodes between the server 104 and the client 102 may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, HTTP and simple mail transfer protocol ("SMTP"), and various combinations of the foregoing. Although only a single client device is depicted in FIG. 1, it should be appreciated that a typical system may include a large number of connected computers.

Although some functions are indicated as taking place on the client 102 and other functions are indicated as taking place on the server 104 various aspects may be implemented by a single computer having a single processor. In accordance with, operations performed on the client 102 may be implemented on the server 104, and vice-versa.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

The client device 102 may be operable to predict navigation events to assist in data access on the network 112. For example, the client devices may predict a likely navigation event to facilitate prerendering of a web page in order to improve the user's browsing experience. In some aspects, the server 104 provides navigation data which may be used by the client devices 106, 108, 110 to predict a likely navigation event. In some aspects, the client devices 106, 108, 110 predict a likely navigation event using local data. In some aspects, a likely navigation event is indicated as a hypertext markup language (HTML) tag embedded within a web page.

Figure 2:
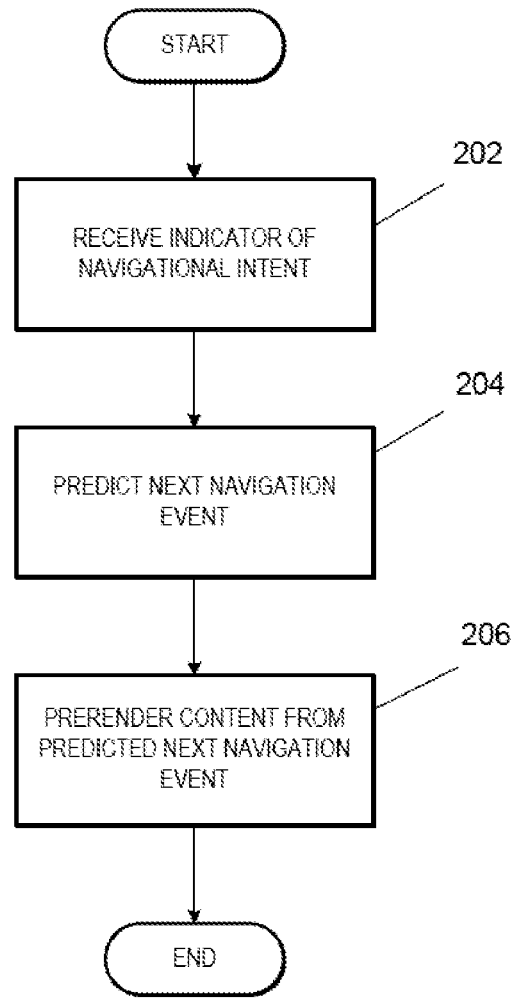
FIG. 2 is a flow diagram depicting an example of a method for prerendering a web page based upon a predicted navigation event in accordance with aspects of the disclosure.

FIG. 2 is a flow diagram depicting an example method 200 for prerendering a web page based upon a predicted navigation event in accordance with aspects of the disclosure. Aspects of the method 200 operate to identify one or more likely navigation destinations from a set of navigation indicators, and then prerender the identified navigation destinations. The method 200 may be performed by a computing device, such as the computing device 102, to eliminate delays in the user web browsing experience by prerendering web pages that are identified as likely navigation targets by the user. For example, the method 200 may be performed by elements of the browser 114. While aspects of the method 200 are described with respect to the computing device 102, the method 200 may also be performed by the server 104, or any device with hardware and/or software designed to accept instructions.

At stage 202, the computing device 102 receives one or more indicators of navigational intent. Navigational intent may be any action that would tend to indicate that the user will generate a particular network request, such as a request for a particular web page. For example, the indicators may provide metrics by which to determine what the particular request will be, such as a confidence value. For example, the user may navigate to a certain web page, from which they generally navigate to another certain web page based upon their browsing history, or the user may move his mouse cursor towards a particular hyperlink embedded within a web page. In some aspects, the indicator is received from a remote server, such as a search engine that embeds an indicator within search results, indicating that most users that submit a particular search query select a particular search result.

At stage 204, after receiving the indicator of navigational intent, the computing device 102 attempts to predict the most likely navigation event. In short, the computing device 102 makes a best guess of to where the user is likely to navigate next, based upon the indicator. Methods of performing this prediction are described below (see FIGS. 4-12).

At stage 206, the computing device 102 prerenders the content from the predicted next navigation event as determined at stage 204. The prerendering process may include storing a prerendered web page within a browser, such as the prerendered web page 115. The computing device 102 may prerender a single web page predicted as the most likely navigation event, or the computing device 102 may prerender multiple pages. In some aspects, the computing device 102 determines the number of pages to prerender based upon one or more system capabilities of the computing device 102, such as available system resources, available network bandwidth, processor speed, installed memory, and the like. In some aspects, the number of pages to prerender may be configurable in one or more user settings. After prerendering the content associated with the navigation event(s), the method 300 ends.

Multiple methods for predicting a next navigation event are provided below. While each method is described separately, it should be appreciated that aspects of the methods may be combined to improve navigation prediction operations.

Figure 3:
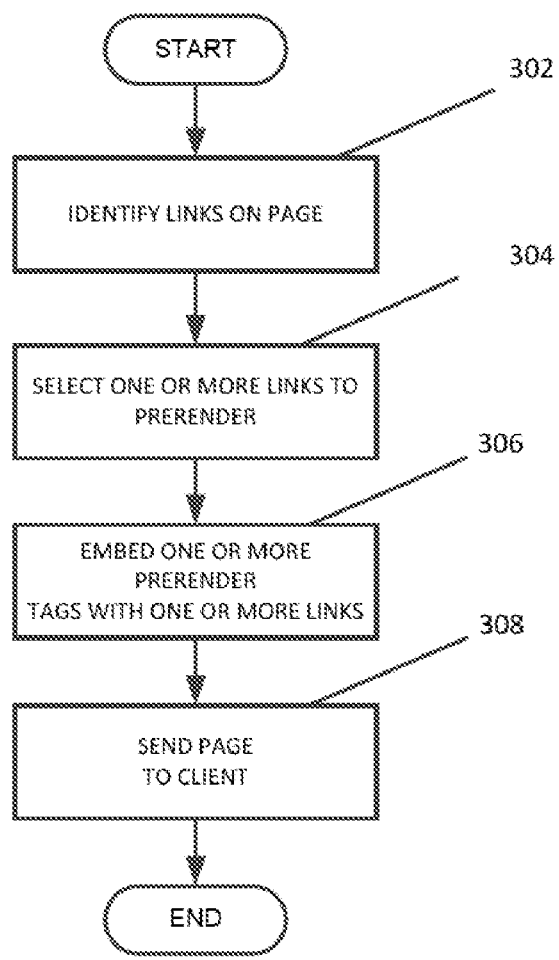
FIG. 3 is a flow diagram depicting an example of a method for indicating a navigation event to prerender in accordance with aspects of the disclosure.

FIG. 3 is a flow diagram depicting an example method 300 for indicating a navigation event to prerender. In some aspects, the server hosting the content, such as the server 104, can specify the navigation event for the web browser to prerender. Allowing the server to specify the prerendered link or links may be optimal for a variety of reasons, such as because the server has the best information on which navigation event is most likely, or because the server wishes to manage bandwidth associated with particular hosted links, such as for load balancing operations. As such, the server 104 may embed a prerender tag or tags within a hosted page, instructing the browser 114 of the client device 102 in which content to render. Although the method 300 describes a process by which links within a web page are identified as prerender targets, prerender targets may be determined irrespective of links available in the browser interface. For example, prerender targets may be identified entirely from user navigation histories and browsing habits, without the need to examine links on a page visible in the browser.

At stage 302, the server 104 identifies one or more links within a hosted web page. For example, the server 104 may generate a list of web sites in response to a query from the client device 102. Each search result may be associated with a particular link on the page that is to be provided in response to the query.

At stage 304, the server 104 selects one or more links to prerender, chosen from the links identified at stage 402. The links to prerender may be chosen by a variety of methods for a variety of purposes, such as by examining a user navigation history, an aggregate navigation history, a most relevant link, and the like. In some aspects, the links are chosen by a search engine analyzing the links most frequently clicked in response to a particular query. For example, the search engine may collect "click-through" data indicating which links are clicked on in response to a particular query, and select one or more links to prerender based upon the frequency with which the particular links are selected. To continue the search engine example, the server 104 might identify the top search result, or the top "n" search results as optimal links to prerender. In some aspects, the server 104 may further identify a ranking of links to prerender, with the most optimal link to prerender being ranked number 1, the next most optimal link being ranked number 2, and so on. The server 104 may also identify a likelihood that each link will be selected, rather than a rank. For example, the server 104 may indicate that a particular link has a 50% likelihood, a 25% likelihood, or a 80% likelihood of being selected by a user. Prerender operations performed by the client may elect to prerender links associated with a threshold level of likelihood, for example, such as at least 50% likelihood, at least 80% likelihood, or any other threshold value.

At stage 306, the server 104 embeds one or more prerender tags with the one or more links identified at stage 304. For example, the server 104 may include a hypertext markup language (HTML) tag for identifying the optimal link or links to prerender. As described above, the prerender tag may also include a ranking value and a TTL value specifying a time to keep the prerender. To continue the search engine example, the server 104 may identify each search result with a prerender tag, along with ranking the prerender order of the results by the relevance of the search result.

At stage 308, the page with the embedded prerender tags is sent to the client that requested the page. The method 300 then ends after sending the page.

Figure 4:
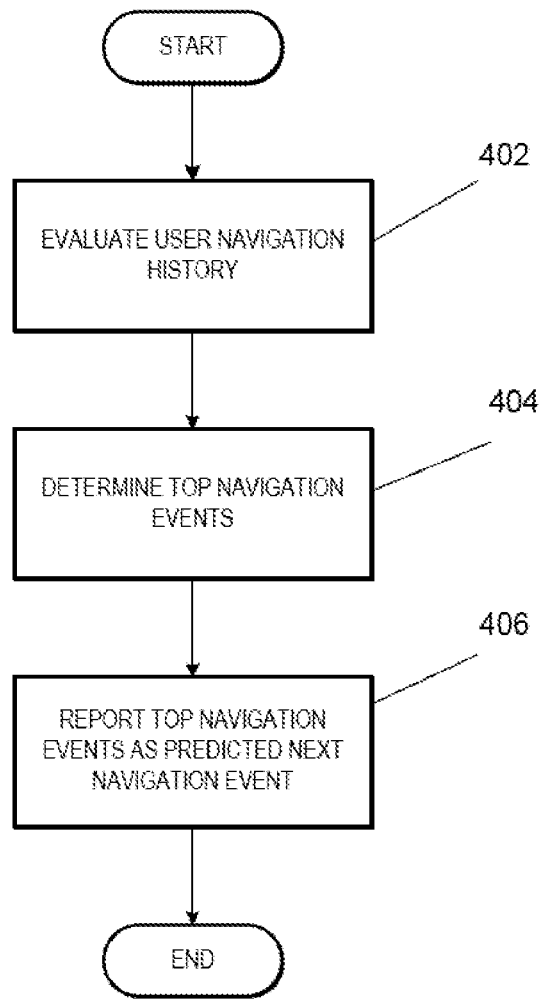
FIG. 4 is a flow diagram depicting an example of a method for predicting a navigation event based on a client navigation history in accordance with aspects of the disclosure.

FIG. 4 is a flow diagram depicting an example method 400 for predicting a navigation event based on a client navigation history in accordance with aspects of the disclosure. The method 400 provides for storing a navigation history for a user, and predicting a next navigation event based upon a navigation history of a particular user. As above, the method 400 may be performed by a computing device such as the computing device 102. In particular, the method 400 may be performed by a browser executing on a processor, such as the browser 114.

At stage 402, the computing device 102 tracks a user navigation history. For example, the computing device 102 may store records of web pages visited by the user, such as the browsing history commonly maintained in web browsers. The browsing history may comprise the URLs of the web pages visited by the user, the order in which the URLs were visited, and the manner in which the user selected the URL (e.g., whether the URL was a clicked hyperlink, typed into an address bar, a redirect operation from another web page, etc.).

At stage 404, the computing device 102 determines a most likely navigation event or events based upon the user navigation history. The most likely navigation events may be determined by identifying the globally most visited pages for the user, or the navigation events may be associated with one or more current criteria. For example, the computing device 102 may examine the user's navigation history to determine that, when the user is viewing a particular news web page, they almost always select a link to the top news story on that page, or that when the user first opens the browser in the morning, they are likely to navigate to their bank account page to check their daily balance. The computing device 102 may employ various rules, heuristics, and filters to determine the most likely navigation event from the user history. The computing device 102 may associate each navigation event with a particular confidence value, indicating the likelihood that the user will select each navigation event. These confidence values may then be used to sort the navigation events to determine the most likely navigation event. A method to determine a confidence value for a given navigation event is described further below (see FIG. 5).

At stage 406, the computing device 102 reports the most likely navigation event as the predicted navigation event. For example, these predicted most likely navigation event may then be employed by the method described above (see FIG. 2) to facilitate prerendering of the web pages associated with the most likely navigation event.

Figure 5:
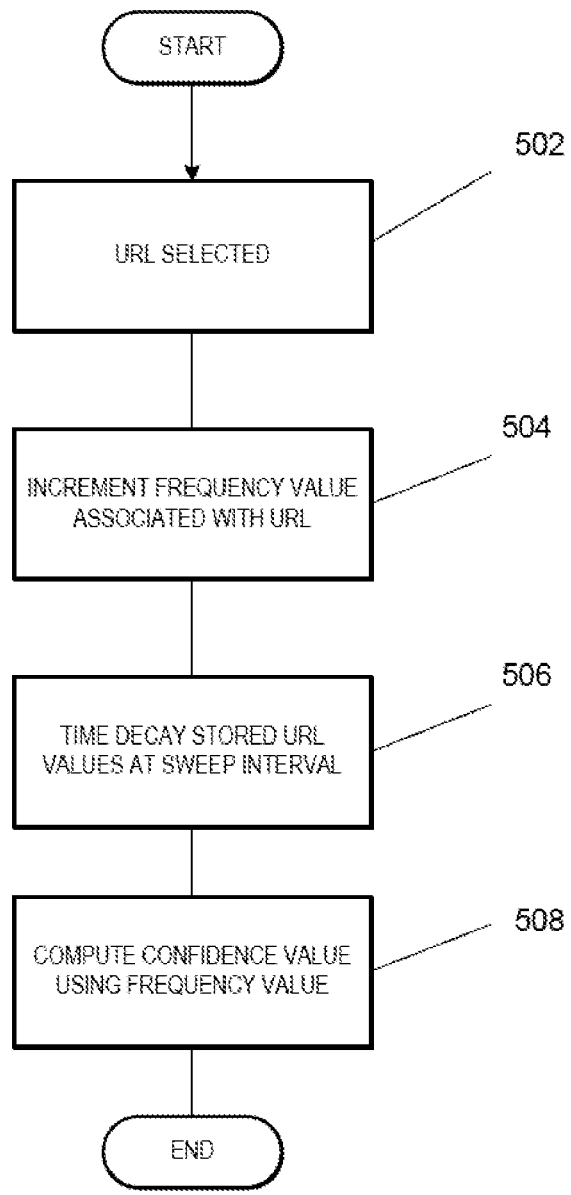
FIG. 5 is a flow diagram depicting an example of a method for computing a confidence value for a URL using a client navigation history in accordance with aspects of the disclosure.

FIG. 5 is a flow diagram depicting an example method 500 for computing a confidence value for a URL using a user navigation history in accordance with aspects of the disclosure. The method 500 is operable to track navigation events input by the user and to maintain a frequency value for each stored event. The method 500 may be employed to build a client navigation history as used by the method 400, and stored on the computing device 102.

At stage 502, the computing device 102 tracks the selection of a particular URL. For example, the user may type a URL for a news site into the browser, or click a link on a page. The computing device 102 may monitor the navigation events using functionality built into the browser 114, through a browser extension such as a plug-in or toolbar, or via a third party application executing in tandem with the browser.

At stage 504, the computing device 102 increments a frequency value associated with the URL selected at stage 502. For example, the computing device 102 may track a frequency value associated with each URL selected by a user. The frequency value is a data metric used to rank a number of visits to a particular web site or the number of times a particular navigation event is selected. In response to a selection operation, the computing device 102 may increment the frequency value associated with the URL, for example by 1.0, 5.0, 10.0, 0.5, or any other value. The frequency value associated with the URL represents how often the user has selected the particular URL, and thus is an indicator of how likely the user is to select the URL in the future.

At stage 506, the computing device 102 time decays the stored frequency values for the URLs after a given "sweep interval". Decaying the URL frequency values in this manner allows for current browsing habits to be more heavily weighted than previous browsing habits. As an example, the computing device 102 may execute the sweep every 30 seconds, every minute, or every 5 minutes during which the user has selected at least one URL. The sweep interval may be conducted in response to the selection of at least one URL during a particular sweep interval to ensure that the navigation history values are not decayed below a threshold value during periods where the user is inactive. The sweep may decay the stored frequency value associated with the URL by a particular value, such as 0.99, 0.5, or 1.0, or by a percentage value, such as 5%, 10%, or 50%. Once the value associated with the URL drops below a given threshold, for example, 0.3, 1.0, or 5.0, the URL may be removed from the list of possible navigation destinations to avoid the list growing too large. After conducting the decay process, the frequency values for the URLs may be persisted to a local storage on the computing device 102, or sent to a remote storage such as provided by the server 104.

At stage 508, the stored frequency values may be used to determine the relative frequency with which the user visits particular web sites. The frequency value thus provides a basis from which a confidence value associated with a navigation event leading to each web site may be derived. In some aspects, the frequency value itself may be provided as the confidence value. In some aspects, the confidence value is determined by comparing a frequency value for a particular web page with the entire user navigation history. For example, the navigation event with the higher frequency value may be associated with a particular percentage confidence value, the second highest frequency value a lower percentage, and the like. In some aspects, the confidence value is determined by frequency value by the total number of logged navigation events. For example, the frequency value of a particular URL may be divided by the sum of all frequency values to determine a confidence value.

For example, a user may be in the process of buying a home, and thus regularly checking financial and banking websites for mortgage rates. During this time, these financial and banking sites would have high values and thus be more likely to be prerendered, thus improving the user experience while searching for a mortgage rate. After completing the home purchase process, the user is likely to lose interest in day to day rate fluctuations, and thus it is no longer optimal to prerender these websites, since the user is unlikely to visit them. As such, providing for a time decay value allows these sites to fall off of the list over time.

Figure 6:
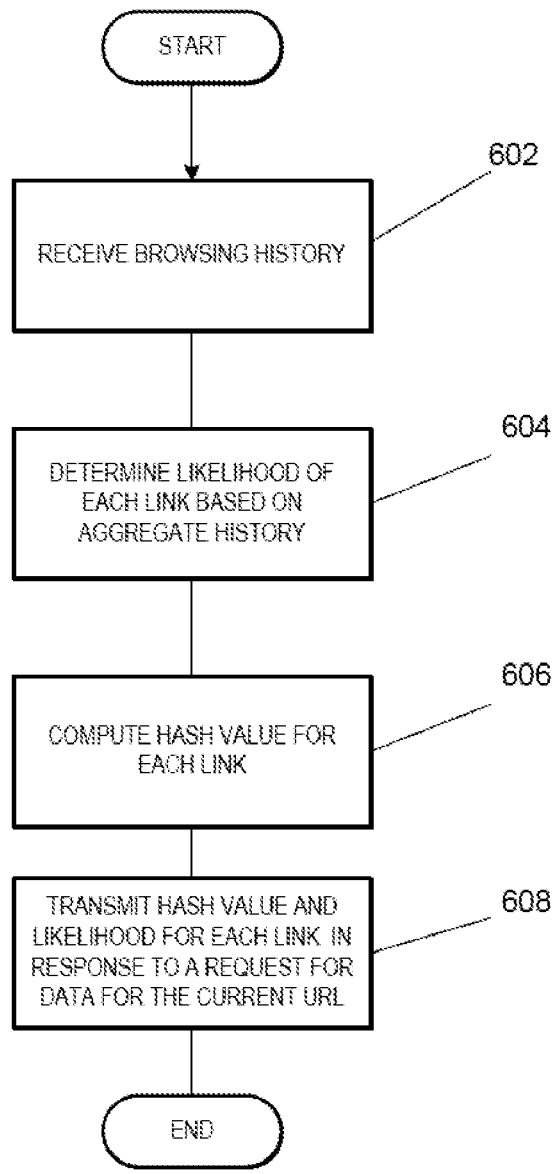
FIG. 6 is a flow diagram depicting an example of a method for predicting a navigation event based on an aggregate navigation history in accordance with aspects of the disclosure.

FIG. 6 is a flow diagram depicting an example method 600 for predicting a navigation event based on an aggregate navigation history in accordance with aspects of the disclosure. The method 600 is operable to track navigation events voluntarily submitted by users to determine likely navigation patterns. The navigation patterns are then analyzed, such as by a server 104, and supplied to the user to facilitate navigation event prediction during the browsing process. For example, a server, such as the server 104, may send updates to a computing device, such as the computing device 102, as the user browses to different pages, to provide information on which link displayed on a given page is most likely to be selected based on the aggregate navigation history. In some aspects, the navigation history may include location data, as described below (see FIGS. 8-10).

At stage 602, the server 104 receives a set of navigation information comprising a browsing history. The browsing history is preferably provided by using an "opt-in/out" method, where the user specifically enables (or disables) reporting functionality to provide elements of their browsing history to the server 104. In addition, personally identifying data can be anonymized and aggregated before it is stored or used, such that no personal information is stored or accessible. A browsing history may be tracked and provided to the server 104 via a browser plug-in or toolbar installed on the user's computing device which tracks the user's browsing history, or by the web browser itself. The browsing history may be combined with other received browsing histories to create a set of aggregate data used in a similar manner as the client navigation history described with respect to FIG. 4, to predict a likely navigation event. The received navigation history may be anonymized to remove any personally identifying information. In some aspects, the received navigation history is received with individual URLs and/or transitional URL pairs provided in a hashed data format to remove any personally identifying information prior to transmission to the server 104.

At stage 604, the server 104 determines a confidence value for each URL on a particular web page, based on the navigation information received at stage 602. For example, the server may employ a method similar to that disclosed above with respect to FIG. 5 for generating confidence values for URLs on a page, except the navigation events are determined based upon aggregated data instead of specific user data. As above, the server 104 may compute confidence values based upon the frequency values derived from the navigation information. In some aspects, confidence values are determined by the percentage of the time that users selected a particular navigation event when they were presented with the choice to select the particular navigation event. The transitional URL pairs provide for the determination of a confidence value by dividing a frequency value of a source/destination URL pair by a total number of appearances of the source URL. In some aspects, the server may determine navigation events based upon transitions from a first page to a second page, rather than from a pure visit frequency metric. The server 104 may maintain an index of web pages and associated URLs and confidence values for each link on the web page, such as in a database. For example, a news site may have five URLs pointing to different news stories. The server 104 may receive aggregate data indicating that one of the five news stories is selected 60% of the time, with the other four being selected 10% of the time each. As such, the server 104 would index the page in a database with a 60% likelihood for the first story link, and 10% likelihoods for each of the other four story links.

In some aspects, the server 104 maintains history data in a confidential manner, such as by converting each URL to a hash value at stage 606. In this manner, the server 104 may provide predicted URL data to a client device without disclosing any personal user data. For example, a user may visit a banking web page that has a particular user name and password login. Depending upon the user, the banking web page may provide URLs to each account the user possesses. Each user accessing the page may have a different set of links provided, depending upon the accounts the user has with the bank. By converting the links on the page to non-reversible hash values, the server 104 may provide confidence values that are not associable to links on the page unless the user also possesses access to the same links (e.g., the client can apply the hash function to links they already possess on the currently viewed page to determine if the confidence values apply). As described above, in some aspects, the hash value is computed by the computing device 102 prior to sending navigation history data to the server 104. In this manner, the server 104 may receive the navigation history data in the hashed format, without the need to compute a hash value.

At stage 608, the server 104 transmits the hash values and confidence values associated with the hash values to a client device, such as the computing device 102. The transmittal may be in response to a request from the computing device 102 for a particular URL. In some aspects, the server 104 may transmit the hash values and confidence values in response to a request for such values from a service executing on the client device 102. For example, when the computing device 102 requests the news web page described above, the server 104 provides the hash values and confidence values for the five story links present on that page. The computing device 102 may also request data for particular link hash values by first generating a hash value on the client side, then requesting a confidence value for the particular hash value from the server 104.

Figure 7:
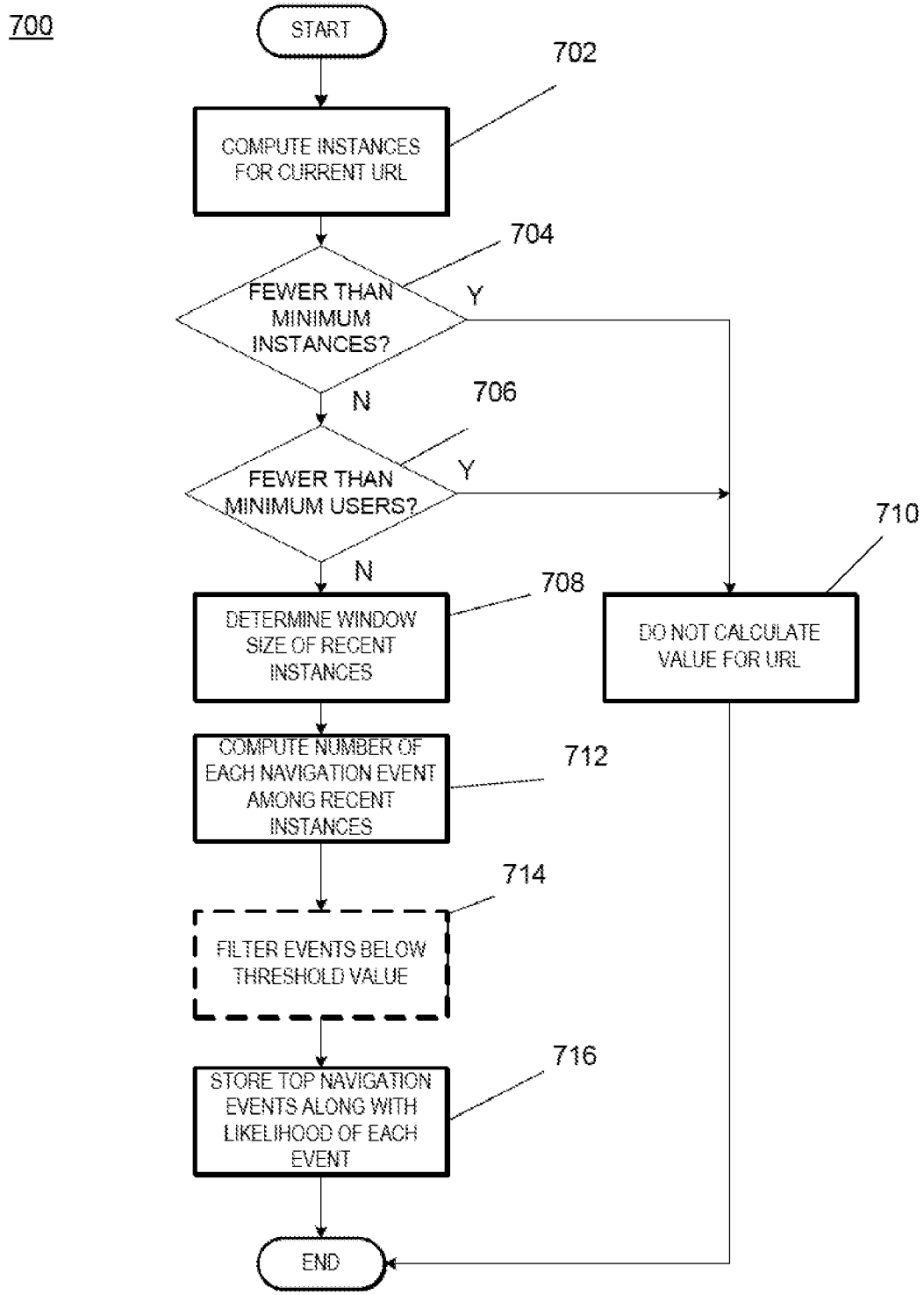
FIG. 7 is a flow diagram depicting an example of a method for computing a confidence value for a URL using an aggregate navigation history in accordance with aspects of the disclosure.

FIG. 7 is a flow diagram depicting an example method 700 for computing a confidence value for navigation events associated with a URL using an aggregate navigation history in accordance with aspects of the disclosure. The method 700 serves to compare navigation events from a given URL received from a plurality of users, in order to determine how likely each individual navigation event is. The confidence values may be determined in relation to a particular "source" web page, with different confidence values for each URL depending upon the page the user is currently viewing. For example, the confidence values may be used above as described with respect to stage 604 of the method 600 (see FIG. 6). Although the method 700 is described using the server 104 as an example, the method 700 (as with other methods in this disclosure) may also be performed by the client 102 to identify prerendering targets.

At stage 702, the server 104 examines received browsing histories and computes a number of instances for each navigation event as associated with a particular URL. As described above, the instance value may be a percentage or a raw number.

At stage 704, the server 104 may determine if the number of visits to the URL exceeds a minimum threshold of statistical significance. For example, five visits to a particular URL may not provide statistically significant data sufficient to reasonably predict a likely navigation event away from the URL. For example, if the number of instances of the event is less than 1000, the server 104 may proceed to stage 710, and not calculate a probability for the event because the sample size is insufficient.

At stage 706, the server 104 may determine if a minimum number of users have submitted data regarding the URL to provide statistically significant data. For example, the method 700 may require that at least 50 users have provided data in order to compute and store a confidence value for the navigation event. Otherwise the method 700 may proceed to stage 710 and disregard the event until a sufficient number of users have provided data. As above, the threshold value may fluctuate depending upon the size of the dataset.

At stage 708, the server 104 determines a window size of recent instances. The window size refers to the number of latest visits to the URL that will be examined to determine the confidence value, or a length of time to search back through the instances. The window size may be determined based on the amount of traffic the URL receives, how often the content of the URL changes. For example, a news website that has constantly changing content might require a small instance window, because links from the regularly changing URL would grow stale. A website with a small amount of traffic would typically require a longer window size in order to gather enough results for statistical significance. The window size might be set at 50 instances, 100 instances, 1000 instances, all instances within the last hour, within the last day, within the last week, or the like.

At stage 712, the server 104 computes the number of times each particular navigation event, such as the next URL visited for the current URL, occurs within the instances defined by the window size determined at stage 710. For example, out of 1000 visits to a news website, a particular article might be selected 600 times, resulting in a confidence value of 60% for navigating to that article from the URL. While the present example primarily relates to determination of a navigation event based upon a number of accesses as a percentage of total navigation events, additional heuristics may also be used to derive the likely event based upon information supplied by the user, such as the previous navigation event (e.g., the website that led to the currently analyzed URL), the time of day (e.g., users are more likely to check news sites when in the morning when they arrive at work), the user's location (e.g., users in a particular geographic region are likely to check sports scores for local teams), or other demographic information.

At stage 714, the server 104 optionally compares the confidence values for the navigations events from the URL with a threshold value. If the confidence values do not meet the threshold value, the server 104 may identify a subset of available navigation events, as possible predicted likely navigation events. In this manner the server 104 avoids predicting navigation events when the event does not have a statistically significant likelihood of occurring, thus potentially saving bandwidth on prerender operations on pages that are unlikely to be visited. The threshold may be set at a variety of different values, such as 5%, 25%, 50%, or 75%. In some aspects, the threshold may be dynamically altered based upon the number of navigation links present at the URL, the type of URL, the traffic of the URL, the speed at which content changes at the URL, and the like. If the confidence values do not meet the minimum threshold, the server 104 may filter out the possible events that do not meet the minimum threshold.

If the navigation event or events meet the minimum threshold, or the method 700 does not check for a minimum threshold, the most likely navigation event or events and the likelihood for each event are stored along with the URL at stage 716. The navigation events and confidence values may be supplied in response to a request to the user, such as occurs at stage 608 described with respect to FIG. 6. The method 700 ends after computing and storing the confidence values for the navigation events associated with the URL.

Figure 8:
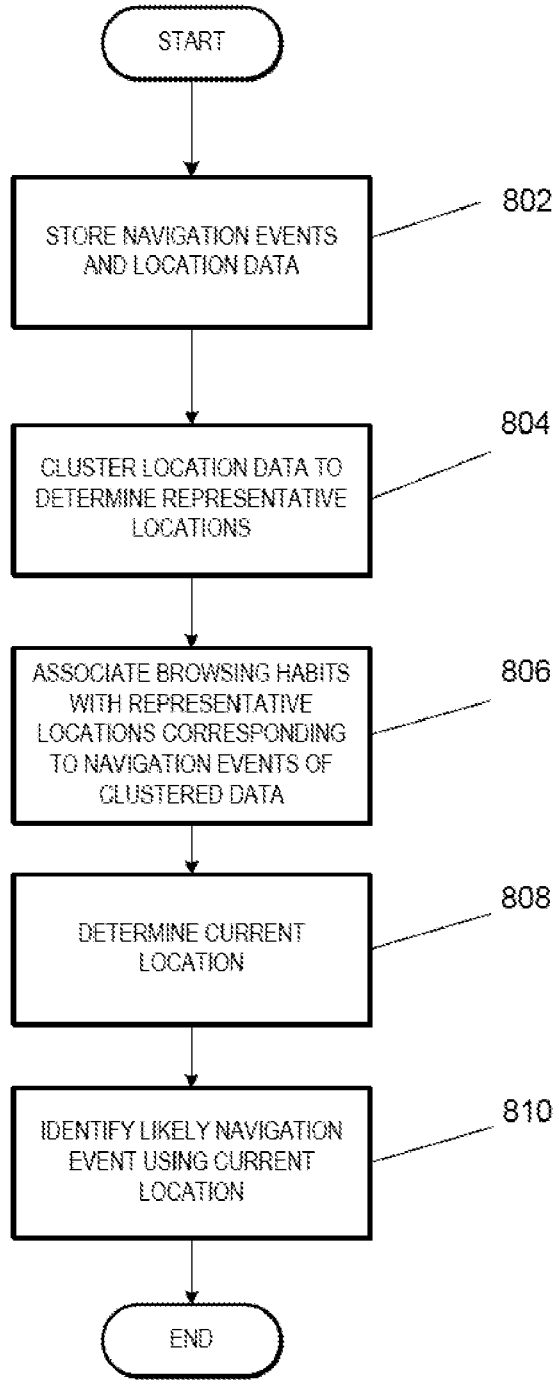
FIG. 8 is a flow diagram depicting an example of a method for predicting a navigation event using location data in accordance with aspects of the disclosure.

FIG. 8 is a flow diagram depicting an example method 800 for predicting a navigation event based on a location. The method 800 is operable to associate user browsing habits with particular locations, such that a location may be used to identify a particular set of browsing habits to assist with prediction of a navigation event for prerendering. The method 800 may receive a set of navigation events associated with locations, and perform clustering operations on those navigation events. The clusters may be identified as discrete locations and associated with particular browsing habits. In this manner, a user may have different navigation events predicted for prerendering based on their location. For example, users typically have different browsing habits at work and at home.

Location may be utilized in concert with other methods of predicting navigation events for prerendering, such as by examining user aggregate navigation histories, monitoring user input devices (e.g., mouse movement), examining user navigation events by time of day, or other methods of predicting a navigation event for prerendering. User navigation histories and location information may be associated with a particular user account or login to gather data from different locations, or the client device 102 may be a mobile device and the user navigation histories and location data may be used to predict navigation events just for the mobile device.

At stage 802, user navigation events are stored along with location data indicating the location from which the user initiated the navigation events. For example, when the user navigates to a particular web page with a browser, a location API may be queried to determine the user's location, and the address of the web page and the location may be stored. The navigation and location data may be stored locally and periodically analyzed, anonymized, or otherwise processed, or the data may be uploaded to a server for storage and analysis.

At stage 804, the location data is clustered to identify representative locations (e.g., home, work, school). Locations may be clustered according to various clustering algorithms such as k-means clustering, hierarchical clustering, density based clustering, distribution based clustering, or any other clustering algorithm. Clustering of the data in this manner may be useful to account for circumstances where location data is imprecise (e.g., where a location is received from a low-resolution source, such as by analyzing an IP address), as navigation events from the same location may not have identical location information.

At stage 806, the navigation events associated with each cluster are identified and aggregated to establish browsing habits associated with each cluster. Thus, the navigation events from which the clusters are constructed are together associated with a single set of browsing habits. Although the clustering operation is described as occurring in response to a navigation event, the clustering operation may be performed at different intervals, such as periodically (e.g., once a day, once a week, etc.), after a certain number of navigation events have occurred (e.g., every 10 navigation events, every 50 navigation events, every 100 navigation events), or when the user has stored a minimum number of navigation events outside of existing clusters.

At stage 808, a current location is determined for performing a prediction operation. For example, the user may active a browser that is enabled for prerendering operations on their home computer or mobile device. The computer may determine a location using, for example, a location API or a GPS receiver. The location may be transmitted to a server and the server may respond with a predicted navigation event, or the server may provide the user navigation history and location data and the prediction may be performed on the local device. To reduce the amount of data transmitted, the server may transmit data cluster information, rather than every navigation event and location measurement contained within the user's location and navigation histories.

At stage 810, a likely navigation event is predicted using the current location. Likely navigation events may be predicted in response to various stimuli. For example, the client device 102 may identify a prerendering target navigation event when navigating to a new web page, when executing a browser for the first time, or any time which calls for determination of a confidence interval for a given navigation event (e.g., any time prerendering may be appropriate). For example, the data may indicate that the user accesses a particular web page 80% of the time when the user is browsing from their current location, in which case that particular web page may be predicted with an 80% confidence value. Depending upon the confidence value of the prediction, the browser may prerender the predicted web page.

Figure 9:
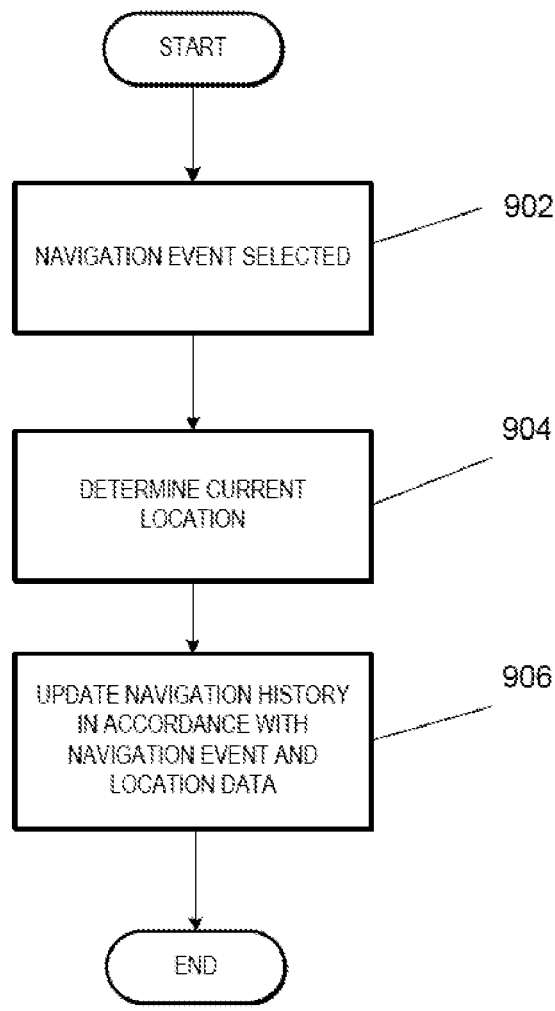
FIG. 9 is a flow diagram depicting an example of a method for building a navigation history using location data in accordance with aspects of the disclosure.

FIG. 9 is a flow diagram depicting an example of a method 900 for using a client device to build a navigation history using location data in accordance with aspects of the disclosure. As the user performs navigation operations and initiates navigation events, the location of the user may be stored in a history along with the navigation events. These navigation event-location pairs may be stored for analysis and clustering for use in prediction of a navigation event, using the user's current location as a data point to more accurately predict the navigation event.

At stage 902, a navigation event (e.g., selection of a hyperlink or entry of a URL in an address bar) occurs. Such navigation events may be stored in a navigation history, such as a history maintained by a web browser.

At stage 904, the location from which the navigation event was selected is determined. This location may be determined using a location API or using a location module coupled to the client device as described above (see FIGS. 1 and 8). The location may refer to a high precision location (e.g., specific GPS coordinates) or a low precision location (e.g., the user is in a particular county, city, city block).

At stage 906, a navigation history for the user is updated with the navigation event and the location from which it was accessed. The navigation history may be stored locally (e.g., on a mobile device that can change location), or it may be uploaded to a server and the server may manage the user's navigation history data. The act of updating the navigation history data may include reclustering of location data (see FIG. 8), and the newly uploaded data may be associated with a particular set of user browsing habits based on the location at which the navigation event occurred.

Figure 10:
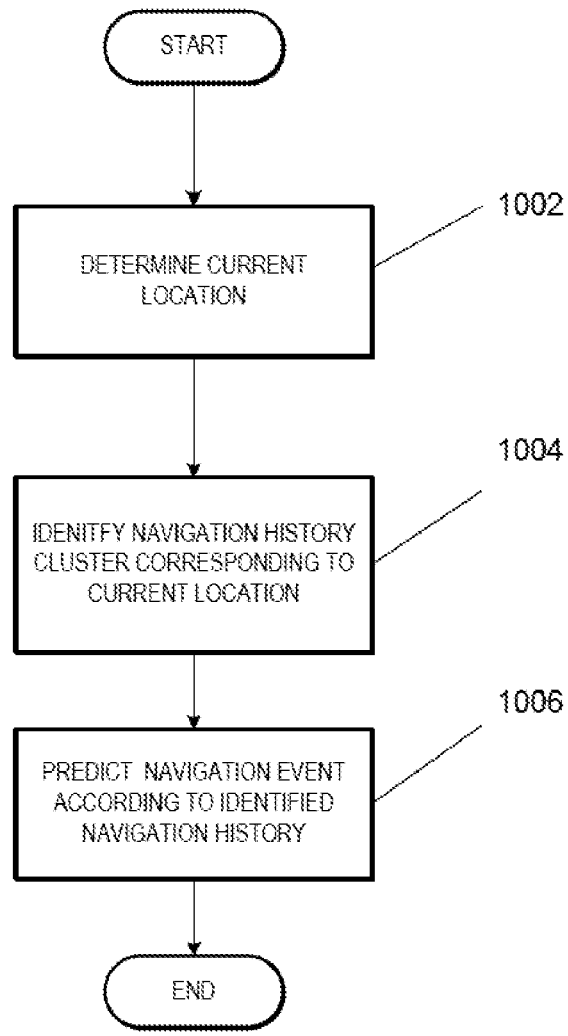
FIG. 10 is a flow diagram depicting an example of a method for selecting a navigation event using location data in accordance with aspects of the disclosure.

FIG. 10 is a flow diagram depicting an example of a method 1000 for selecting a navigation event using location data in accordance with aspects of the disclosure. Stored navigation history data may be used to predict navigation events, as user browsing habits may be correlated to their location. The method 1000 is operable to predict a navigation event for prerendering based on the location of the user. As described above (see FIG. 8), location history data may be apportioned into clusters to establish browsing habits associated with those clusters. The location of the user may thus be used to identify one of these clusters for analysis to predict a navigation event. As described above (see FIG. 8), a navigation event may be predicted in response to any situation where it is appropriate to choose a particular navigation event for prerendering.

At stage 1002, the current location of the user is determined. As described above, the location may be determined according to various methods, including the use of a location API or a GPS receiver.

At stage 1004, the determined location is used to identify a particular cluster of locations corresponding to navigation events. This cluster of navigation events may be identified as the user's browsing habits when at the determined location based on the proximity of the determined location to some part of the cluster. At stage 1006, the predicted navigation event is determined using the navigation events associated with the cluster. The data points that make up the cluster are each associated with navigation events, such that these navigation events may be used to predict a next navigation event, or used in concert with other navigation event prediction mechanisms to increase a confidence value of the prediction. For example, the navigation event that is most frequently associated with the cluster of events may be identified as the predicted navigation event. A particular confidence value may be associated with the navigation event, such that if the navigation event has a low confidence value, no action is taken by the browser. The stages of the illustrated methods are not intended to be limiting. The functionality of the methods can exist in a fewer or greater number of stages than what is shown and, even with the depicted methods, the particular order of events may be different from what is shown in the figures.

The systems and methods described herein advantageously provide for an improved browsing experience. By prerendering the next navigation event, the system and methods minimize the amount of time users wait for network content to load. Location data provides additional information to assist in prerendering predictions, such that the accuracy of prerendering is enhanced when accounting for the user's location. Increased prerendering accuracy provides time savings for the user by prerendering appropriate content more consistently, and provides bandwidth savings for content hosts by ensuring that they do not provide content that is not seen by the user.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A computer-implemented method for accessing network content, the method comprising:
 determining a location of a client device;
 identifying, using a processor, a set of browsing habits corresponding to one or more past physical locations of the client device, the set of browsing habits comprising a plurality of navigation events associated with the one or more past physical locations;
 clustering the set of browsing habits into subsets using location data associated with the plurality of navigation events, each clustered subset indicating a past physical location at which an aggregate of navigation events occurred;
 predicting a navigation event using the clustered subsets, wherein at least one subset of the clustered subsets corresponds to the location of the client device; and
 prerendering the predicted navigation event using the client device, wherein the prerendered predicted navigation event is stored in a completely executed and rendered format.

2. The method of claim 1, wherein the plurality of navigation events are associated with a particular user account.

3. The method of claim 1, wherein the location is determined using a location application programming interface.

4. The method of claim 1, wherein the plurality of navigation events are stored as navigation event-location pairs.

5. The method of claim 1, further comprising:
 sending the location to a remote server; and
 receiving the set of browsing habits from the remote server in response to sending the location to the remote server.

6. The method of claim 1, further comprising:
 selecting a selected navigation event; and
 storing the location and the selected navigation event in the plurality of navigation events.

7. A non-transitory computer readable storage medium storing instructions, that when executed by a processor, cause the processor to perform a method comprising:
 determining a location of a client device;
 identifying a set of browsing habits corresponding to one or more past physical locations of the client device, the set of browsing habits comprising a plurality of navigation events, the subset associated with the one or more past physical locations;
 clustering the set of browsing habits into subsets using location data associated with the plurality of navigation events, each clustered subset indicating a past physical location at which an aggregate of navigation events occurred;
 predicting a navigation event using the clustered subsets, wherein at least one subset of the clustered subsets corresponds to the location of the client device; and
 prerendering the predicted navigation event using the client device, wherein the prerendered predicted navigation event is stored in a completely executed and rendered format.

8. The non-transitory computer readable storage medium of claim 7, wherein the plurality of navigation events are associated with a particular user account, and wherein the client device is logged into the particular user account.

9. The non-transitory computer readable storage medium of claim 7, wherein the location is determined using a location application programming interface.

10. The non-transitory computer readable storage medium of claim 7, wherein the plurality of navigation events are stored as navigation event-location pairs.

11. The non-transitory computer readable storage medium of claim 7, the method further comprising:
 sending the location to a remote server; and
 receiving the set of browsing habits from the remote server in response to sending the location to the remote server.

12. The non-transitory computer readable storage medium of claim 7, the method further comprising:
 selecting a selected navigation event; and
 storing the location and the selected navigation event in the plurality of navigation events.

13. A processing system for predicting navigation events, the processing system comprising:
 a memory for storing navigation events; and
 at least one processor coupled to the memory, the at least one processor being configured to:

determine a location of a client device;

identify a set of browsing habits corresponding to one or more past physical locations of the client device, the set of browsing habits comprising a plurality of navigation events associated with the one or more past physical locations;

cluster the set of browsing habits into one or more subsets using location data associated with the plurality of navigation events, each clustered subset indicating a past physical location at which an aggregate of navigation events occurred;

predict a next navigation event using at least one of the one or more subsets; and prerender the predicted next navigation event using the client device, wherein the prerendered predicted next navigation event is stored in a completely executed and rendered format.

14. The system of claim 13, wherein the processor is further configured to:

receive a current location from a client device; and determine the at least one of the one or more subsets to be used in predicting the next navigation event using the current location.

15. The system of claim 13, wherein the next navigation event is predicted by sending the at least one of the one or more subsets to a client device.

16. The system of claim 13, wherein the next navigation event is predicted by selecting the next navigation event from the at least one of the one or more subsets and sending the next navigation event to a client device.

17. The system of claim 13, wherein the processor is further configured to accept a user credential to access a user account, and wherein the plurality of navigation events are associated with the user account.

18. The system of claim 13, wherein the processor is further configured to:

receive at least one of the plurality of navigation events and a location associated with the at least one navigation event; and store the at least one of the plurality of navigation events and the location associated with the at least one navigation event in the memory.

* * * * *